United States Patent
Stapleton et al.

(10) Patent No.: US 10,045,218 B1
(45) Date of Patent: Aug. 7, 2018

(54) ANOMALY DETECTION IN STREAMING TELEPHONE NETWORK DATA

(71) Applicant: Argyle Data, Inc., San Mateo, CA (US)

(72) Inventors: Padraig Stapleton, Pleasanton, CA (US); David Staub, San Francisco, CA (US); Arshak Navruzyan, San Mateo, CA (US)

(73) Assignee: Argyle Data, Inc., San Mateo, CA (US)

( * ) Notice: Subject to any disclaimer, the term of this patent is extended or adjusted under 35 U.S.C. 154(b) by 0 days.

(21) Appl. No.: 15/661,531

(22) Filed: Jul. 27, 2017

Related U.S. Application Data

(60) Provisional application No. 62/367,503, filed on Jul. 27, 2016.

(51) Int. Cl.

| | |
|---|---|
| *H04W 12/12* | (2009.01) |
| *H04M 7/00* | (2006.01) |
| *H04M 1/66* | (2006.01) |
| *G06N 99/00* | (2010.01) |
| *G06N 7/00* | (2006.01) |

(52) U.S. Cl.
CPC ............ *H04W 12/12* (2013.01); *G06N 7/005* (2013.01); *G06N 99/005* (2013.01); *H04M 1/66* (2013.01); *H04M 7/0078* (2013.01)

(58) Field of Classification Search
CPC ..... H04W 12/12; H04M 7/0078; H04M 1/66; G06N 99/005; G06N 7/005
See application file for complete search history.

(56) References Cited

U.S. PATENT DOCUMENTS

| | | | | |
|---|---|---|---|---|
| 5,950,121 | A * | 9/1999 | Kaminsky | H04M 15/00 455/410 |
| 8,554,912 | B1 * | 10/2013 | Reeves | G06F 21/552 455/410 |
| 9,367,844 | B1 * | 6/2016 | Hu | G06Q 20/4016 |
| 9,614,972 | B2 * | 4/2017 | Ballai | H04M 7/0078 |
| 2017/0032267 | A1 * | 2/2017 | Bogojeska | G06N 7/005 |

OTHER PUBLICATIONS

Staub et al "Real-time Anomaly Detection in Streaming Cellular Network Data", Research Paper, submitted for presentation at academic conferences 2017.

* cited by examiner

*Primary Examiner* — Brandon J Miller
(74) *Attorney, Agent, or Firm* — Ohlandt, Greeley, Ruggiero & Perle L.L.P.

(57) ABSTRACT

In one example, a method includes receiving a feature vector that characterizes a call history for a telephone network subscriber, wherein the feature vector comprises respective categorical values for one or more categorical features and respective continuous values for one or more continuous features, and applying, to the categorical values, a first algorithm to determine a categorical score for the feature vector. The example method further includes applying, to the continuous values, an isolation forest algorithm to determine a continuous score for the feature vector, and outputting, in response to determining at least one of the categorical score for the feature vector and the continuous score for the feature vector indicate the feature vector is anomalous, an indication that the feature vector is anomalous.

25 Claims, 9 Drawing Sheets

ANOMALY DETECTION IN STREAMING TELEPHONE NETWORK DATA

This application claims the benefit of U.S. Provisional Application No. 62/367,503, filed Jul. 27, 2016, which is incorporated by reference herein in its entirety.

TECHNICAL FIELD

This disclosure relates to fraud detection and, more specifically, to detecting fraud in telephone network usage.

BACKGROUND

Fraudulent usage of cellular and other telephone networks is a growing threat for both network subscribers and operators. Telecommunications providers worldwide lose billions of dollars to abusive and/or fraudulent usage of their networks each year. Fraud detection systems currently deployed typically use predefined rules with static thresholds to flag suspicious activity. Criminal individuals and organizations, however, employ increasingly sophisticated and ever-evolving techniques to thwart such defenses. In one type of fraudulent activity, referred to as PBX hacking, hackers penetrate the phone systems of firms and place calls to premium rate numbers. PBX hacking is estimated to cost the industry over $4 billion per year. In another fraud approach, known as Wangiri fraud, criminals use automated dialing services to ring and immediately hang up on thousands of users at once, inducing them to dial the missed number, an overseas premium rate line. Perpetrators executing this attack cost carriers approximately $2 billion globally each year. In another $5 billion scheme, subscription fraud, stolen credit card and identity information is used to set up new phone plans. Exorbitant usage during the initial billing period follows and the bill is never paid. Overall, carriers sacrifice an estimated 5% of their yearly revenue to fraudulent network usage.

SUMMARY

Techniques are described for detecting fraudulent usage of telephone networks using, in various examples, a machine learning-based approach in which a detection system automatically learns the difference between normal and anomalous call patterns based on historical usage data. The described techniques may provide computational efficiency suitable for real-time processing, high fraud classification accuracy, and the ability to incorporate feature sets containing both categorical and continuous features. Examples are included showing test results of the techniques using a synthetic dataset simulating actual fraud scenarios and demonstrating improved performance over other state-of-the-art machine learning methods.

The techniques described herein may provide a robust fraud detection solution capable of identifying previously unseen attacks in real-time and adapting to evolving network usage patterns.

In one example, a computing device comprises one or more programmable processors operably coupled to a memory, the memory configured to cause the one or more programmable processors to: receive a feature vector that characterizes a call history for a telephone network subscriber, wherein the feature vector comprises respective categorical values for one or more categorical features and respective continuous values for one or more continuous features; apply, to the categorical values, a first algorithm to determine a categorical score for the feature vector; apply, to the continuous values, an isolation forest algorithm to determine a continuous score for the feature vector; and output, in response to determining at least one of the categorical score for the feature vector and the continuous score for the feature vector indicate the feature vector is anomalous, an indication that the feature vector is anomalous.

In one example, a method includes receiving a feature vector that characterizes a call history for a telephone network subscriber, wherein the feature vector comprises respective categorical values for one or more categorical features and respective continuous values for one or more continuous features, and applying, to the categorical values, a first algorithm to determine a categorical score for the feature vector. The example method further includes applying, to the continuous values, an isolation forest algorithm to determine a continuous score for the feature vector, and outputting, in response to determining at least one of the categorical score for the feature vector and the continuous score for the feature vector indicate the feature vector is anomalous, an indication that the feature vector is anomalous.

In one example, a non-transitory computer-readable medium comprises instructions for causing at least one programmable processor to: receive a feature vector that characterizes a call history for a telephone network subscriber, wherein the feature vector comprises respective categorical values for one or more categorical features and respective continuous values for one or more continuous features; apply, to the categorical values, a first algorithm to determine a categorical score for the feature vector; apply, to the continuous values, an isolation forest algorithm to determine a continuous score for the feature vector; and output, in response to determining at least one of the categorical score for the feature vector and the continuous score for the feature vector indicate the feature vector is anomalous, an indication that the feature vector is anomalous.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
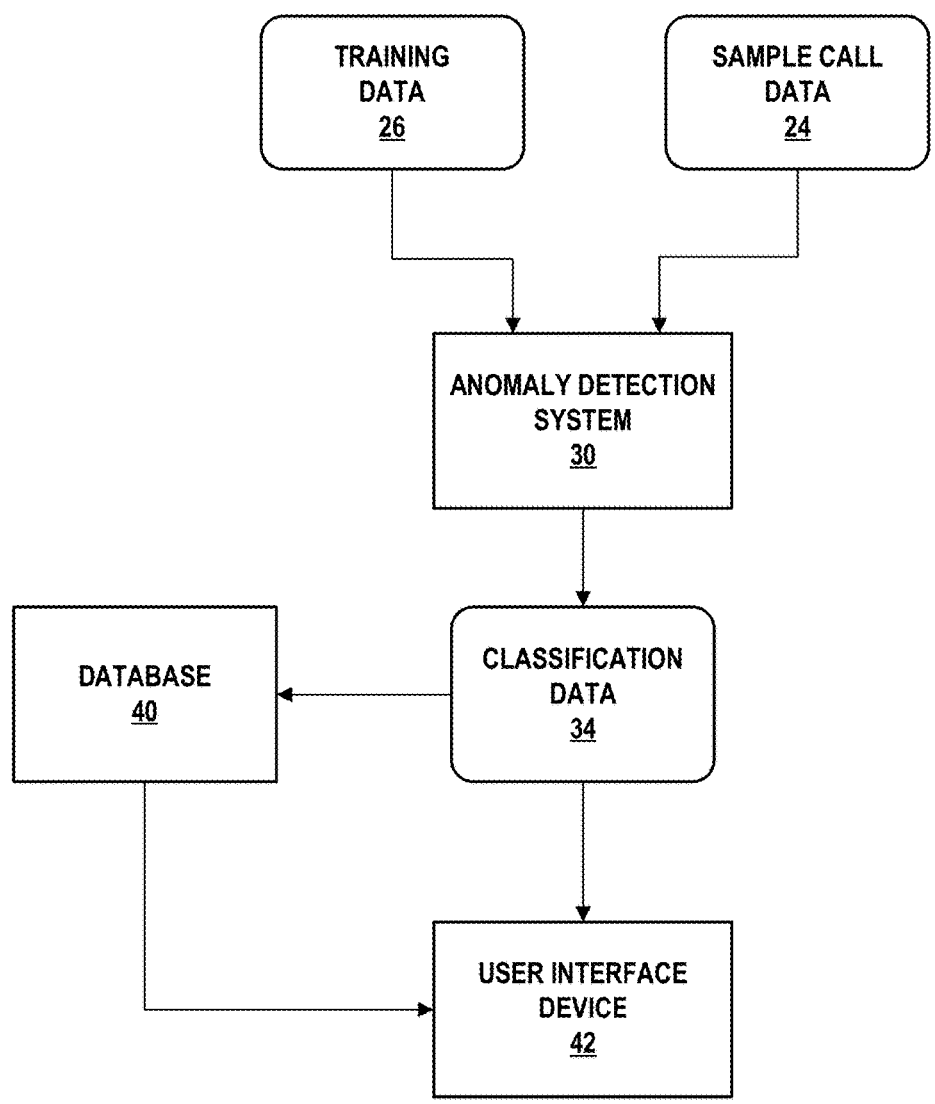
FIG. 1 is a block diagram illustrating an example anomaly detection system for identifying telephone network fraud, according to techniques described in this disclosure.

FIG. 1 is a block diagram illustrating an example anomaly detection system for identifying telephone network fraud according to techniques described in this disclosure. Anomaly detection system 30 represents one or more computing devices to perform operations described herein to process sample call data 24 to identify anomalous telephone call patterns. For example, anomaly detection system 30 may include one or more mobile devices, compute nodes, virtual machines or containers, servers, workstations, or one or more cloud computing service nodes for a public, private, or hybrid cloud.

Sample call data 24 characterizes telephone calls for at least one subscriber for a telephone network service provider. In some cases, the telephone network service provider may be a cellular network service provider and the sample call data 24 may characterize only cellular telephone calls. Sample call data 24 may include one or more "samples" or "data points" that each represents a feature vector that includes a mixed set of categorical and continuous features that characterize a recent call history for a subscriber. That is, the feature vector is a sample or data point that describe a recent call history for a subscriber. The recent call history may be for a month, a day, an hour, or another time period. In some cases, sample call data 24 is generated by pre-processing multiple telephone call records for at least one subscriber. In some cases, sample call data 24 may represent "raw" telephone call record data that is processed by anomaly detection system 30 to generate feature vectors for the one or more subscribers having call histories included in sample call data 24. Feature vectors are described in further detail below. In some example implementations, sample call data 24 represents live or almost live call data generated in real-time as cellular telephone calls occur for one or more subscribers.

Sample call data 24 may be provided by the telephone network service provider. The telephone network service provider may in some cases stream the sample call data 24 to anomaly detection system 30 in near real-time. Anomaly detection system 30 may be developed and/or deployed by a third party that provides fraud or other anomaly detection services to the telephone network service provider.

Anomaly detection system 30 includes a set of one or more trained models for application to sample call data 24 to identify anomalies in sample call data 24. The trained models may be trained using training data 26 that includes a telephone network traffic dataset. Like sample call data 24, training data 26 may include one or more samples or data points that each represents a feature vector that includes a mixed set of categorical and continuous features that characterize a recent call history for a subscriber. Training data 26 may represent a large dataset describing many thousands of call records. Training data 26 may include actual call records, synthetic call records, or a combination thereof.

Anomaly detection system 30 performs operations described herein to classify the anomalousness of feature vectors in sample call data 24 based on a categorical score determined for categorical features of the feature vector and a continuous score determined for continuous features of the feature vector. Anomaly detection system 30 may output the respective categorical scores and continuous scores as classification data 34 to indicate the anomalousness of feature vectors in sample call data 24. Anomaly detection system 30 may apply thresholding to categorical scores and continuous scores to label features vectors in sample call data 24 as anomalous or normal (e.g., "binary fraud classification") and output such labeling data in classification data 34.

In some examples, anomaly detection system 30 may determine per-sample (i.e., per-feature vector) feature importance of one or more of the categorical and/or continuous features of each feature vector in sample call data 24. A feature importance for a given feature corresponds to a relevance of the feature to determining the feature vector is anomalous.

Anomaly detection system 30 may store classification data 34 to a storage database 40 for later analysis by, e.g., a fraud detection analyst using a user interface device 42. Anomaly detection system 30 may directly output the classification data 34 for display to the user interface device 42.

User interface device 42 may be implemented as any suitable device for presenting output and/or accepting user input. For instance, user interface device 42 may include a display for displaying classification data 34 to a user. User interface device 42 may be a computing system, such as a computing device operated by a user. User interface device 42 may, for example, represent a workstation, a laptop or notebook computer, a desktop computer, a tablet computer, or any other computing device that may be operated by a user and/or that presents a user interface in accordance with one or more aspects of the present disclosure. In some examples, user interface device 42 may be physically separate from and/or in a different location than anomaly detection system 30. In such examples, user interface device 42 may communicate with anomaly detection system 30 over a wired or wireless network, direct physical cabling, or other means of communication. In other examples, user interface device 42 may be a local peripheral of anomaly detection system 30, or may be integrated into anomaly detection system 30.

Anomaly detection system 30, database 40, and user interface 42 may be used in conjunction with any of the methodologies or operations described in this disclosure.

1. INTRODUCTION

In general, anomaly detection uses historical data (known as a training set) to build empirical models characterizing normal behavior patterns. A trained model can then be used to predict the degree to which a new sample differs from the norm. As only normal behavior needs to be understood, previously unseen attacks can be identified, addressing a principal drawback of rule-based approaches. For the purposes of fraud detection in streaming network usage data an ideal anomaly detector would have the following attributes: 1) efficiency suitable for real-time processing, 2) high accuracy in identification of fraud, and 3) seamless integration of both categorical and continuous features. Item 1 is important for handling the high volume of traffic on large cellular networks, as well as providing timely alerts when fraudulent activity occurs. Item 2 is necessary to avoid flooding human fraud analysts with false positives, while also maintaining a high fraud identification rate. Item 3 is important for making use of all information available in streaming network usage data. For instance, categorical features (or "categorical values"), such as a network user's subscription type (corporate, personal, etc.) and plan type (postpaid, prepaid, etc.), as well as continuous numerical feature, such as the magnitude of a user's recent data, voice, or Short Messaging Service (SMS) usage, all constitute valuable features that should be incorporated into a model.

Since the 19th century, anomaly or outlier detection has been studied in the statistics community. Various types of anomaly detection techniques have been developed including classification, clustering, nearest neighbor, statistical, information theoretic and spectral methods. Depending on the nature of input data (binary, categorical, continuous; univariate, multivariate; unstructured, structured) and type of anomaly (point anomaly, contextual anomaly, collective anomaly) different algorithms are reported in the literature. This disclosure describes the use of mixed (continuous and categorical) multivariate data and contextual anomalies to identify anomalous telephone call patterns.

Early approaches anomaly or outlier detection used parametric statistical models to approximate the distribution of the data, including univariate and multivariate models. These parametric approaches require a priori knowledge to choose an appropriate model for the data and become more difficult to fit as the data dimensionality grows. More recently, nonparametric methods, that do not require assumptions about the data distribution, have been developed. Such methods typically fall into one of three categories: distanced-based, clustering-based, and density based approaches. Distance based methods identify outliers as points that lie unusually far away from their neighbors according to a chosen distance metric, e.g., Euclidean distance. These algorithms use a k-nearest neighbors (kNN) framework algorithm, for example, classifying points as outliers if the fraction of the nearest k neighbors falling within a distance d from the point falls below a specified threshold. Such algorithms operate in quadratic time; therefore, several authors have proposed approaches that operate in sub-quadratic or approximately linear time. All such methods judge a point's "outlierness" based on a global comparison to the training data and thus can miss points that are locally anomalous. Clustering based methods can somewhat mitigate the limitations of global comparison by identifying outliers as points without strong membership in any one cluster group. In contrast, density based methods approximate the probability distribution of the training data and then identify anomalies as instances falling in low probability regions. Example methods include Gaussian mixture models, the local outlier factor (LOF), and kernel density estimation. A principal drawback of distance, clustering, and density based methods is their dependence on distance metrics, which become less meaningful as the dimensionality of the data grows. A newer method that avoids this dependence is the Isolation Forest algorithm. This approach identifies anomalies as points that are easily "isolated" using randomly generated binary decision trees.

All of the above methods assume datasets containing only continuous valued features. In order to process categorical or mixed feature sets, nonnumeric values must be mapped to an integer representation, which may make little sense, particularly for distance based approaches. However, such methods can be enhanced with probabilistic frameworks in order to incorporate mixed attribute feature sets. The LOADED algorithm was designed specifically to handle mixed feature datasets using the idea of frequent itemsets. The algorithm divides the training dataset into subsets based on the values of categorical features, and for each subset models the continuous features using a covariance matrix. A similar approach for a fast outlier detection algorithm for large distributed data with mixed-type attributes, named ODMAD, that replaced the covariance matrix with cosine similarity and improved on the scoring of anomalies occurring in the categorical space. ODMAD demonstrates superior efficiency and accuracy compared to LOADED.

Examples of ODMAD are described further in Koufakou & Michael, "A fast outlier detection strategy for distributed high-dimensional data sets with mixed attributes," *Data Mining and Knowledge Discovery* 20 (2): 259-89, 2009, which is incorporated by reference herein in its entirety.

Described herein are techniques for combining the Isolation Forest algorithm and a modified version of the ODMAD algorithm to achieve the three above-stated goals. These techniques may be collectively referred to as "Pyrite" in this disclosure. In particular, ODMAD provides a framework for seamlessly handling mixed-feature feature-sets, while Isolation Forest supplies state of the art performance for scoring the subset of continuous features, with the combination maintaining the computational efficiency required for real-time processing. An additional goal, per-sample feature importance, can also be supported using a wrapper-based meta-algorithm.

2. METHODS AND MATERIALS a. Precursor Algorithms

Before describing the Pyrite algorithm, it is useful to first review ODMAD and Isolation Forest in more detail. ODMAD uses an approach that natively handles mixed feature datasets (otherwise known as "mixed attribute datasets") with no required transformation of continuous to categorical, or vice versa. First, infrequent itemsets within the subset of categorical features are identified (as used herein, the term "feature" may refer to an "attribute" and vice-versa). An itemset d consists of a particular combination of values within a subspace s of the categorical features; for instance, {red, triangle} could be an itemset in a dataset containing the categorical feature subspace {color, shape}. An itemset is considered infrequent if the count of training samples (or "training feature vectors") containing the itemset, referred to as its support, falls below a user-specified threshold SIGMA. The support of all itemsets up to a user-specified MAX_LEN in length are calculated. Next, the collection of itemsets identified as infrequent is pruned such that all remaining sets contain only frequent itemsets. This increases the computational efficiency of the algorithm without sacrificing performance. In the second step subsets of the training data sharing a common categorical feature value are identified. Within each subset samples containing highly infrequent itemsets, with support falling below a user-specified LOW_SUP parameter, are discarded, and the mean vector of the continuous features for the remaining samples is calculated. Discarding samples with low-support itemsets prevents outliers already identified in the categorical space from masking previously unidentified outliers in the continuous/mixed space. After this procedure is complete anomaly scores can be generated for new samples as follows. A categorical score is computed by summing the inverse of the product of itemset support and length over all infrequent itemsets contained within the sample. This highlights highly infrequent itemsets spanning a small number of features. A continuous score is generated by calculating the cosine similarity between the continuous values of the new sample and the mean vectors for each single categorical feature value contained in the sample. In effect, each continuous score is made conditional on the values of the categorical feature. User specified thresholds can then be applied to both continuous and categorical scores to flag anomalies. ODMAD offers intuitive, natural support for mixed feature datasets, however its continuous value scoring mechanism does not handle negative values properly and can miss nonlinear interactions between continuous features.

Isolation Forest is an anomaly detection algorithm with similar architecture to the Random Forest algorithm that natively offers support for continuous features only. It identifies anomalies as those samples most easily "isolated" from the general population. Like Random Forest, Isolation Forest constructs an ensemble of binary decision trees, each of which produces a score, with the final score consisting of the average over all trees. A single tree is constructed by recursively splitting a randomly chosen subset of the data based on randomly chosen features with randomly selected thresholds. Splitting is continued until each sample is separated from all other instances, i.e. isolated. On average, unusual instances will be isolated more easily than normal instances, therefore the number of partitions a sample must traverse in order to be completely separated can be used as an anomaly score. Isolation Forest avoids the use of distance metrics and scales well with both number of samples and features. It can also capture nonlinear relationships between variables and is robust to irrelevant features. Its chief drawback is lack of support for categorical variables. Examples of Isolation Forest are described in further detail in Liu et al., "Isolation-Based Anomaly Detection," *ACM Transactions on Knowledge Discovery from Data* 6 (1): 1-39, 2012, which is incorporated by reference herein in its entirety.

b. Pyrite Algorithm

Anomaly detection system 30 may apply the Pyrite algorithm to identify anomalous telephone call patterns, according to techniques of this disclosure. The Pyrite algorithm combines ODMAD and Isolation Forest to harness the strengths, and mitigate the weaknesses, of each. This is primarily accomplished by substituting Isolation Forest for cosine similarity as the continuous scoring mechanism used by ODMAD. In addition, subspaces based on multiple, rather than single, categorical features up to length MAX_LEN are used to subsample the data for continuous scoring, allowing for exploration of additional subspaces of potential interest. Finally, a new parameter, MAN_FEATS, is introduced that allows user-specified categorical features to be designated as mandatory. That is, MAN_FEATS denotes mandatory categorical features that determine subspaces of interest for determining continuous scores. Such features (e.g., color) are then required to be included in any subspace for which continuous scores are calculated. This mechanism forces all continuous models to be conditioned on categorical features known a priori to be important, allowing for the injection of domain specific knowledge into the modeling process.

Like ODMAD, Pyrite applied by anomaly detection system 30 produces a separate score for both categorical and continuous feature subsets. Anomaly detection system 30 computes the categorical score according to this formulation:

$$\text{score}_{cat}(x_i) = \sum_{d \subseteq x_i^c \land d \in D_p} \left( \frac{1}{supp(d)|d|} \right) \quad (1)$$

where $x_i^c$ represents the categorical values of the instance to be scored, d is an itemset, supp(d) is the support of itemset d within the training dataset X, |d| is the number of features in itemset d, and $D_p$ is the set of pruned, infrequent itemsets. Itemsets $d_i$ within $D_p$ may in some cases be required to satisfy the following three conditions:

a. $\text{supp}(d_i) < \text{SIGMA}$ b. $|d_i| < \text{MAX\_LEN}$ c. $d_j \neq d_i | d_j \in D_p, d_j \neq d_i$ Based on this formula the contribution of each infrequent itemset within $x_i^c$ to the final anomaly score is inversely proportional to both its length and frequency within the training set. In order to apply Equation (1) to new instances, the set of pruned infrequent itemsets and their supports may first be calculated within the training data 26 by anomaly detection system 30. This constitutes the initial phase of model training.

In the second phase of model training the continuous feature scoring function is calibrated by anomaly detection system 30. As in ODMAD, data points (or more simply, "points") containing highly infrequent categorical itemsets, according to a user-specified low support parameter LOW_SUP, are first identified and removed from the training set. This removes the risk of such points masking previously unidentified outliers in the continuous feature space. Next, anomaly detection system 30 determines the set of itemsets around which the remaining training samples will be grouped, $D_g$:

$$D_g = \{d : d \in D | s_d \supseteq \text{MAN\_FEATS} \land |d| \leq \text{MAX\_LEN}\} \quad (2)$$

where $s_d$ is the subspace to which itemset d belongs and D is the complete collection of itemsets. For each itemset d in $D_g$ the set of training points (feature vectors) $X_d$ containing itemset d are identified:

$$X_d = \{x_i \in X | x_i^c \supseteq d\} \quad (3)$$

and an Isolation Forest model is trained on the continuous portion of each training sample group $X_d^q$:

$$iforest_d = \text{train\_model}(X_d^q) \quad (4)$$

where each trained model returns an anomaly score between 0 and 1. Once Isolation Forest models have been fit on all valid subsets of the training data, anomaly detection system 30 may calculate a continuous score for a new sample as the anomaly score averaged over relevant Isolation Forest models:

$$\text{score}_{cont}(x_i) = \frac{1}{|d \in D_g \land x_i^c \supseteq d|} \sum_{d \in D_g \land x_i^c \supseteq d} [iforest_d(x_i^q)] \quad (5)$$

Once both scores have been computed for a given sample, anomaly detection system 30 applies thresholds to determine whether the instance should be classified as anomalous or normal. Typically, such thresholds are chosen based on achieving a domain specific balance between false negatives and false positives. Anomaly detection system 30 that applies the thresholds may output, to user interface device 42, an indication of the result of the thresholding for display to a user. In the above description, each of the data points may represent a feature vector that includes a mixed set of categorical and continuous features that characterize a recent call history for a subscriber.

Pyrite can also provide per-sample feature importance, i.e. the importance of each value in a particular feature vector to the anomaly score that it produces. In some examples, anomaly detection system 30 determines per-sample feature importance as follows. For the categorical features, a running sum is kept for each feature. When a subset containing that feature contributes to the categorical anomaly score that contribution is added to the feature's tally. The final sum for each feature indicates its importance.

For continuous features, a wrapper-based approach is used. During training a mean feature vector is computed for each subset of the data on which an Isolation Forest model is trained. A baseline anomaly score is then computed by predicting on these mean vectors. Next, for each continuous feature a new score is calculated by substituting the value of that feature into the mean vectors. The importance for that feature can then be quantified as the difference between the baseline score and the score with substituted feature value. Once again, the greater the score, the more important the feature. Anomaly detection system 30 may output, to user interface device 42, an indication of the per-feature importance for display to a user.

c. Synthetic Network Traffic Dataset

Analyzing the performance of unsupervised learning algorithms is challenging as labeled gold standard data is usually not available, though efforts to make datasets containing labeled anomalies publicly available are growing. To benchmark the accuracy and computational efficiency of the Pyrite algorithm, the Pyrite algorithm was tested on a dataset simulating typical cellular network traffic with a small amount of fraudulent activity. Synthetic data is used to avoid compromising sensitive customer information as well as to make ground truth anomaly labels available for a domain of interest.

Normal data is simulated for 1000 subscribers of a fictitious cellular provider with the following parameters, although other parameters may be used:

Call Volume: the number of calls made by a user on a particular day is randomly sampled from a Gaussian distribution with mean 4 and standard deviation 1.5.

Call Duration: the duration of each call is randomly sampled from a Gaussian distribution with mean of 5 minutes and standard deviation of 20 seconds.

Call Time: the time of day for each call is randomly selected from a normal distribution centered at 12:00 pm with standard deviation 2.5 hours.

Call Location: the country locations of the subscriber and other party are randomly selected from a set of typical countries for the region. Selection is weighted towards the home country.

Fraudulent call traffic is simulated for a variety of typical attacks according to the following scenarios, although other scenarios are possible:

International Revenue Share Fraud (IRSF): A subscriber roaming in a country neighboring the home country makes multiple long calls to a premium rate number in a risky foreign country.

Call Collision: Multiple subscribers roaming in a country neighboring the home country make many long, overlapping (colliding) calls to the same group of premium rate numbers in a risky foreign country.

Wangiri: A nonsubscriber in a foreign country makes a large number of calls to different subscribers and hangs up immediately. Approximately 20% of the subscribers see the missed call and call back, driving traffic to a premium rate number in a risky country. This scenario is visualized in FIG. 2.

IMEI Switch: A subscriber roaming in a foreign country first displays normal usage patterns. The IMEI (International Mobile Equipment Identifier—unique handset identifier) associated with the subscriber's subscriber identification module (SIM) card then changes, after which there is high call activity to premium rate numbers in a risky foreign country.

Inactive Customer: A customer whose account has been deactivated is still using the network.

Additional fraudulent activity is simulated based on generic call patterns. These scenarios are intended to differ to a much lesser degree from normal activity, and thus present a greater challenge to successful detection. The following scenario is included in this category, although other scenarios may be included:

High Voice Usage: A customer with an individual plan (i.e. non-corporate account) uses an unusually high amount of voice minutes while roaming.

Figure 2:
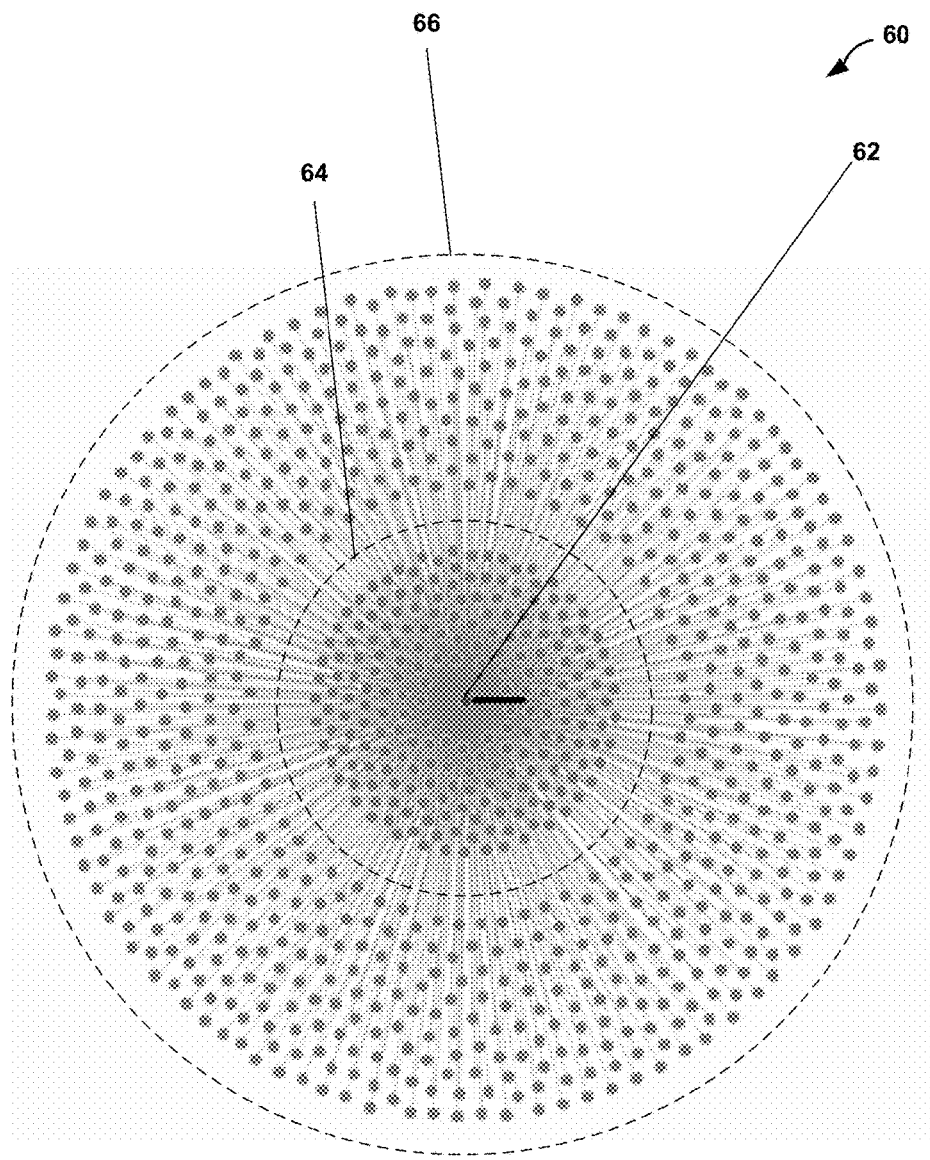
FIG. 2 depicts a graph representation of an example Wangiri fraud scenario.

10 examples of each of the 6 types of fraud scenario are simulated in the dataset. FIG. 2 depicts a graph representation 60 of the Wangiri fraud scenario. The innermost node 62 represents the attacker, a nonsubscriber making a rapid succession of zero-duration calls to network subscribers (ring and hang up). The inner circle of nodes 64 represents subscribers who have seen the missed call and called back. The outer circle 66 of nodes represents subscribers who have not yet called back.

d. Model Features

Raw call metadata (call duration, numbers for both parties, call start time, etc.) may not provide a rich dataset on which to perform anomaly detection. In particular, it gives no insight into the recent call patterns of a cellular network user. Therefore, prior to modeling raw call records may be transformed into feature vectors that account for a user's recent call history. Each value in the feature vector is a metric calculated on all network activity attributed to the user in the previous 24 hours designed to reveal usage patterns of potential interest. In addition, features based on customer information (customer type, customer segment, billing history, etc.) can be added to further enrich the dataset, with the final feature set consisting of both categorical and continuous features. The metrics calculated from the synthetic benchmark dataset consist of 4 categorical and 21 continuous features, belonging to 5 feature groups, as detailed below:

Categorical Features

Provider Affiliation: binary flag indicating whether the network user is a subscriber of the telco operator Customer Type: binary flag indicating whether the network user is a prepaid or postpaid customer Customer Segment: binary flag indicating whether the network user is a corporate or personal customer Customer Status: binary flag indicating whether the network user has an account that is currently active Continuous Features Call Duration Group: metrics describing the distribution of call durations (e.g., 4 features)

Call Density Group: metrics describing call spacing and clustering (e.g., 4 features)

Call Direction: metrics describing the distribution of incoming vs. outgoing calls (e.g., 6 features)

Call Location Group: metrics describing the locations from which calls were made and received (e.g., 2 features)

Customer Details Group: metrics describing customer billing history, length of time as an active subscriber, etc. (e.g., 1 feature)

3. EXPERIMENTAL RESULTS

The performance of the Pyrite, ODMAD, and Isolation Forest algorithms was tested using the synthetic network traffic dataset. For the Isolation Forest algorithm, categorical features were encoded as integer values. For each of the 6 fraud scenarios introduced in Section 2.b, 10 "fraud events" were included in the dataset, for a total of 60 events. A single fraud event was comprised of many calls executed over a short time period (typically a day or less) that together comprised the attack, e.g. the call pattern depicted in FIG. 2. After training each model on the dataset, 10 call records from each scenario were randomly sampled for anomaly scoring, with the top scoring records from each retained for analysis. In addition, approximately 100,000 normal records were scored and included in the analysis. This procedure was used to mimic the high background of normal events from which fraudulent instances should be efficiently identified in a real-world setting.

As all three algorithms return a continuous score between 0.0-1.0, a threshold may be applied to obtain the final binary fraud classification. Anomaly detection system 30 may be configured to apply such thresholds to continuous scores for feature vectors for new sample call data for one or more subscribers. In general, such thresholds can be tuned to adjust the tradeoff between true and false positives based on the demands of the problem domain.

Figure 3A:
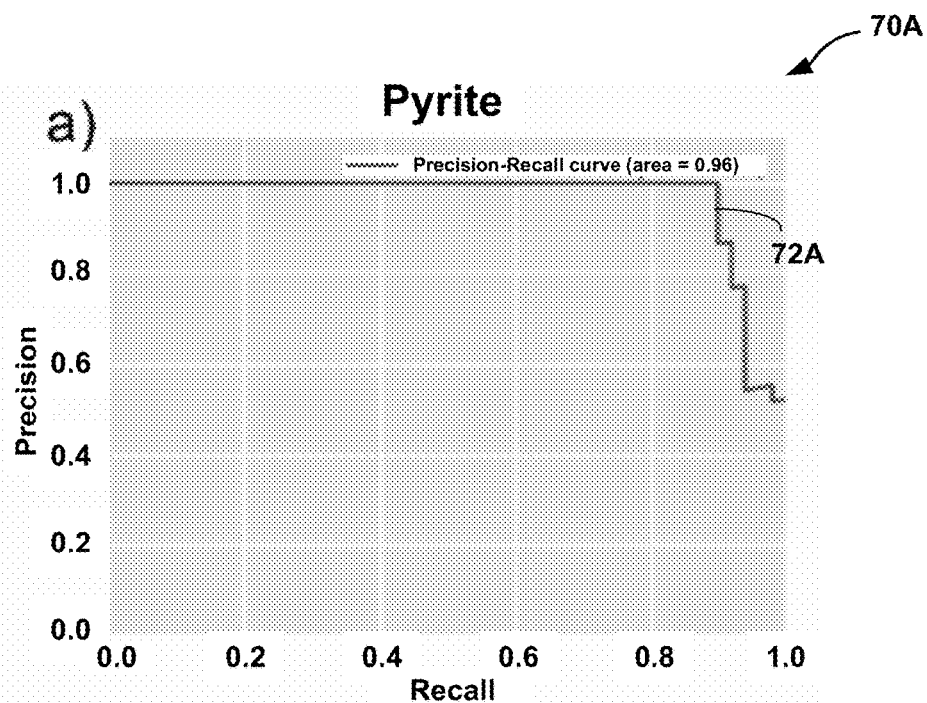
FIGS. 3A-3C depicts plots of example precision-recall curves based on the scores returned by the Pyrite, Isolation Forest, and ODMAD algorithms, respectively.
Figure 3B:
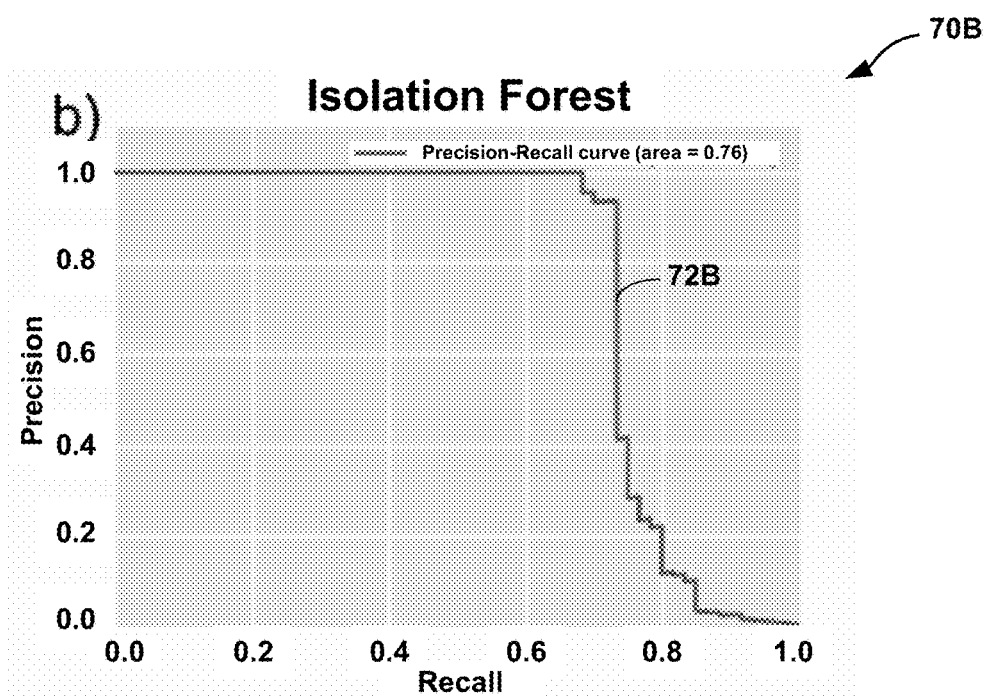
Figure 3C:
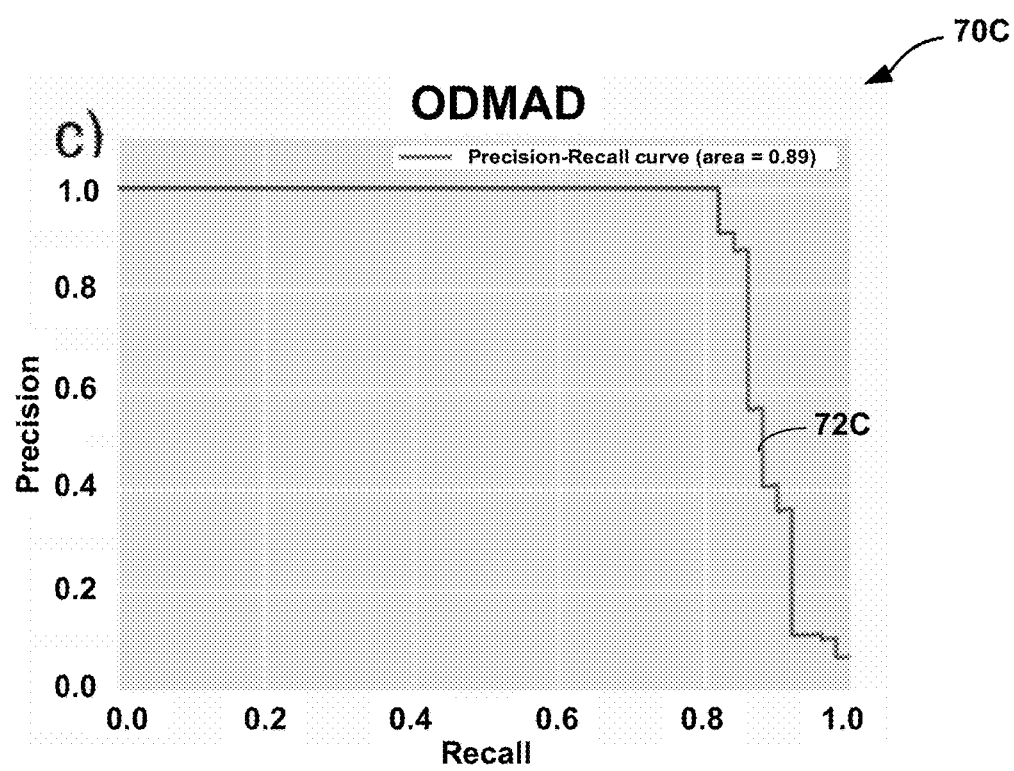

FIGS. 3A-3C depicts plots 70A-70C of precision-recall curves 72A-72C based on the scores returned by the Pyrite, Isolation Forest, and ODMAD algorithms, respectively. FIGS. 3A-3C thus provide a threshold-agnostic view of performance. A precision-recall curve plots the tradeoff between the fraction of flagged items that are relevant (precision) vs. the fraction of relevant items that are flagged (recall) as the classification threshold is varied. It is useful for analyzing classification problems where the class of interest is much rarer than the alternative class, e.g., fraudulent vs. normal behavior.

Each of the plots 70A-70C in FIGS. 3A-3C shows a respective area under the curve (AUC) calculated from the corresponding precision-recall curve to provide a single number quantifying the quality of each model. The AUC for precision-recall curve 72A for Pyrite is 0.96 in this example. The AUC for precision-recall curve 72B for Isolation Forest is 0.76 in this example. The AUC for precision-recall curve 72C for ODMAD is 0.89 in this example.

Figure 4A:
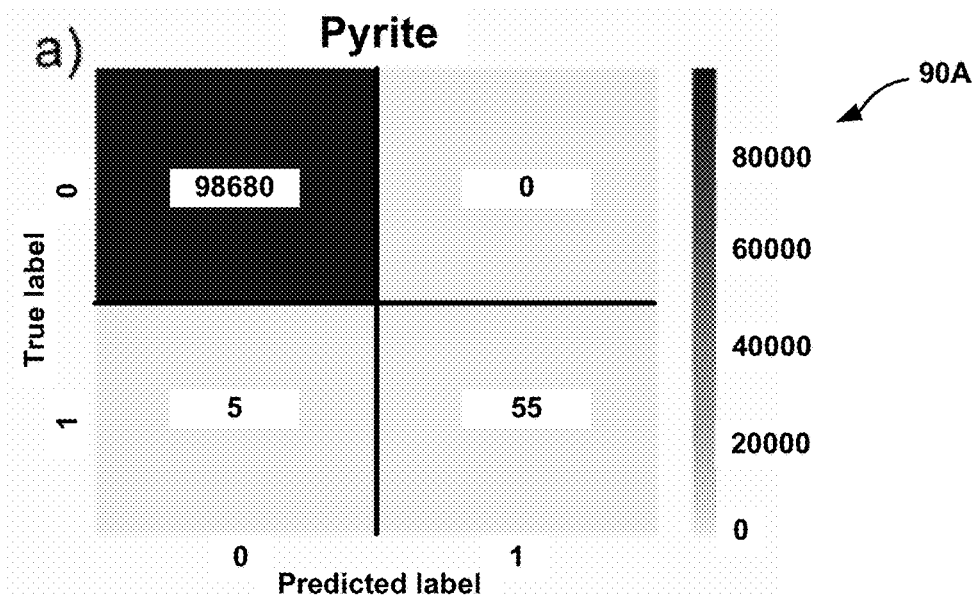
FIGS. 4A-4C depict example confusion matrices for Pyrite, Isolation Forest, and ODMAD, respectively.
Figure 4B:
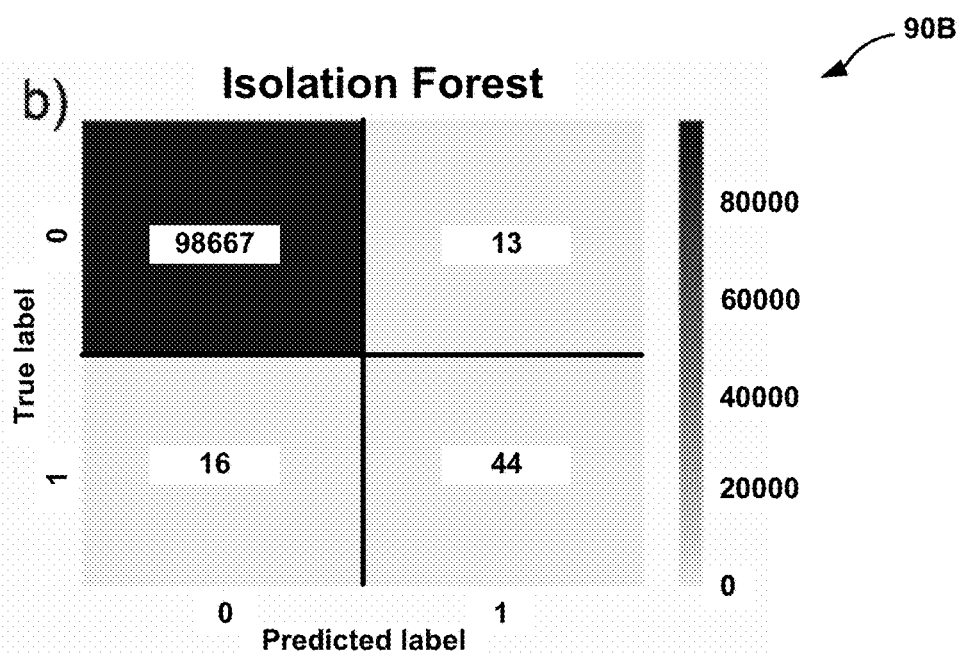
Figure 4C:
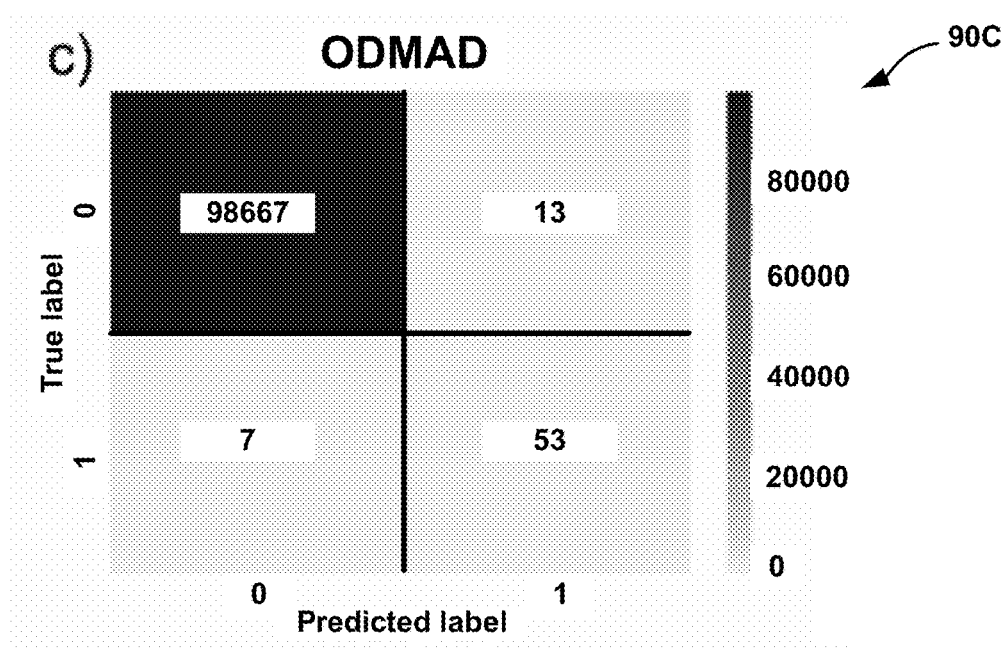

FIGS. 4A-4C depict confusion matrices 90A-90C for Pyrite, Isolation Forest, and ODMAD, respectively. Starting from the top left and moving clockwise the quadrants of each matrix list the number of true negatives, false positives, true positives, and false negatives. Labels of "0" and "1" indicate normal and fraud classifications, respectively.

To generate data for confusion matrices 90A-90C, a base threshold was chosen for the corresponding model (Pyrite, Isolation Forest, and ODMAD) such that a precision of 0.75 was achieved. The threshold was then increased if doing so did not sacrifice recall. Each confusion matrix 90 was generated by calculating thresholds as determined by the above procedure.

Figure 5:
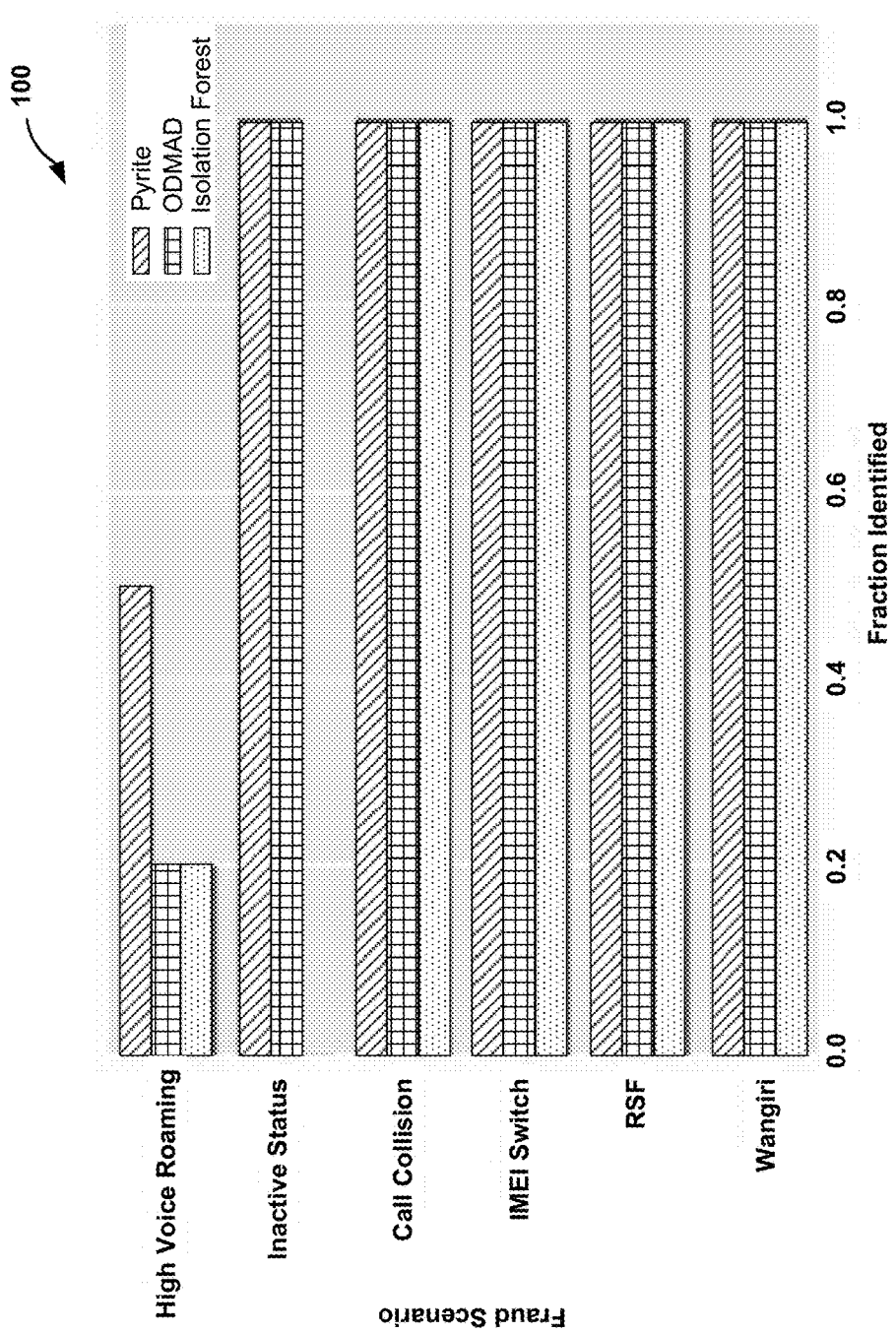
FIG. 5 is a graph depicting an example of a more granular breakdown of the results depicted in FIGS. 4A-4C.

FIG. 5 is a graph depicting a more granular breakdown of the results depicted in FIGS. 4A-4C. Graph 100 plots the fractions of correctly identified fraud events for each fraud scenario under test, for each of the Pyrite, Isolation Forest, and ODMAD models.

4. FURTHER DISCUSSION

FIGS. 3A-3C show AUCs of 0.96, 0.76, and 0.89 for Pyrite, Isolation Forest, and ODMAD, respectively. These values indicate the overall superior performance of the Pyrite predictor over its two constituent algorithms. The confusion matrices 90A-90C in FIGS. 4A-4C show that Pyrite is able to correctly identify all but 5 fraud events while misclassifying no normal instances. In contrast, both ODMAD and Isolation Forest flag 13 normal samples as fraudulent, accounting for 23% and 20% of total positive instances respectively. From FIG. 5 it is evident that all three algorithms struggled to varying degrees with the "High Voice Usage" scenario. This was expected, as this scenario does not differ greatly from normal traffic patterns beyond a relatively moderate increase in call volume. However, in comparison to ODMAD, Pyrite's more sophisticated scoring mechanism allowed it to identify more such fraud events without alerting on normal instances. FIG. 5 also demonstrates the benefits of explicitly considering categorical variables. Both ODMAD and Pyrite were able to easily flag all "Inactive Subscriber" fraud events, due simply to the rarity of the "Inactive Status" flag in the dataset. Conversely, the need for Isolation Forest to encode categorical variables as numeric greatly reduced the influence of this variable, resulting in misses for all "Inactive Subscriber" events. For the remaining scenarios each fraud event was caught by all three algorithms. This is reasonable as these scenarios all contained highly unusual activity in the form of extremely heavy call volumes (Wangiri), extremely long call durations (Call Collision and IRSF), or risky usage after a rare event (IMEI Switch).

An additional point of interest for each algorithm was computational efficiency. Some implementations of Isolation Forest may utilize the Scikit-learn package, a popular machine learning library written in Python. Though Scikit-learn provides a Python interface, most performance critical pieces of the codebase are written in the C language to deliver maximum efficiency. Both the ODMAD and Pyrite algorithms were written in Python. Anomaly detection system 30 may be configured to apply a version of Pyrite that uses the Scikit-learn version of Isolation Forest. Prediction times for Pyrite, Isolation Forest, and ODMAD on a test dataset containing 100,000 samples with 32 features were 3.4, 4.0, and 41.0 seconds respectively. These results demonstrate that Pyrite provides suitable performance for real-time analysis of a realistic volume of streaming data. In some example implementations, anomaly detection system 30 may be configured to apply a Pyrite implementation that parallelizes a single-threaded version of the code.

A final consideration is the ability to specify the contribution of each feature to the anomaly score for a single instance, i.e., per-sample feature importance. In a real world setting this capability may be useful for providing human fraud analysts with insight into the reasons a network user's activity was flagged as fraudulent. A more sophisticated approach to determining per-sample feature importance, in some examples, may take advantage of the structure of the decision trees used in each Isolation Forest model. Specifically, each time a split point is traversed the average depth of the tree before and after the split may be calculated. The difference between the two may be added to a running sum for the feature on which the split was performed. Since high scoring samples take short paths through the decision trees, features that significantly reduce average tree depth can be considered the most important.

Figure 6:
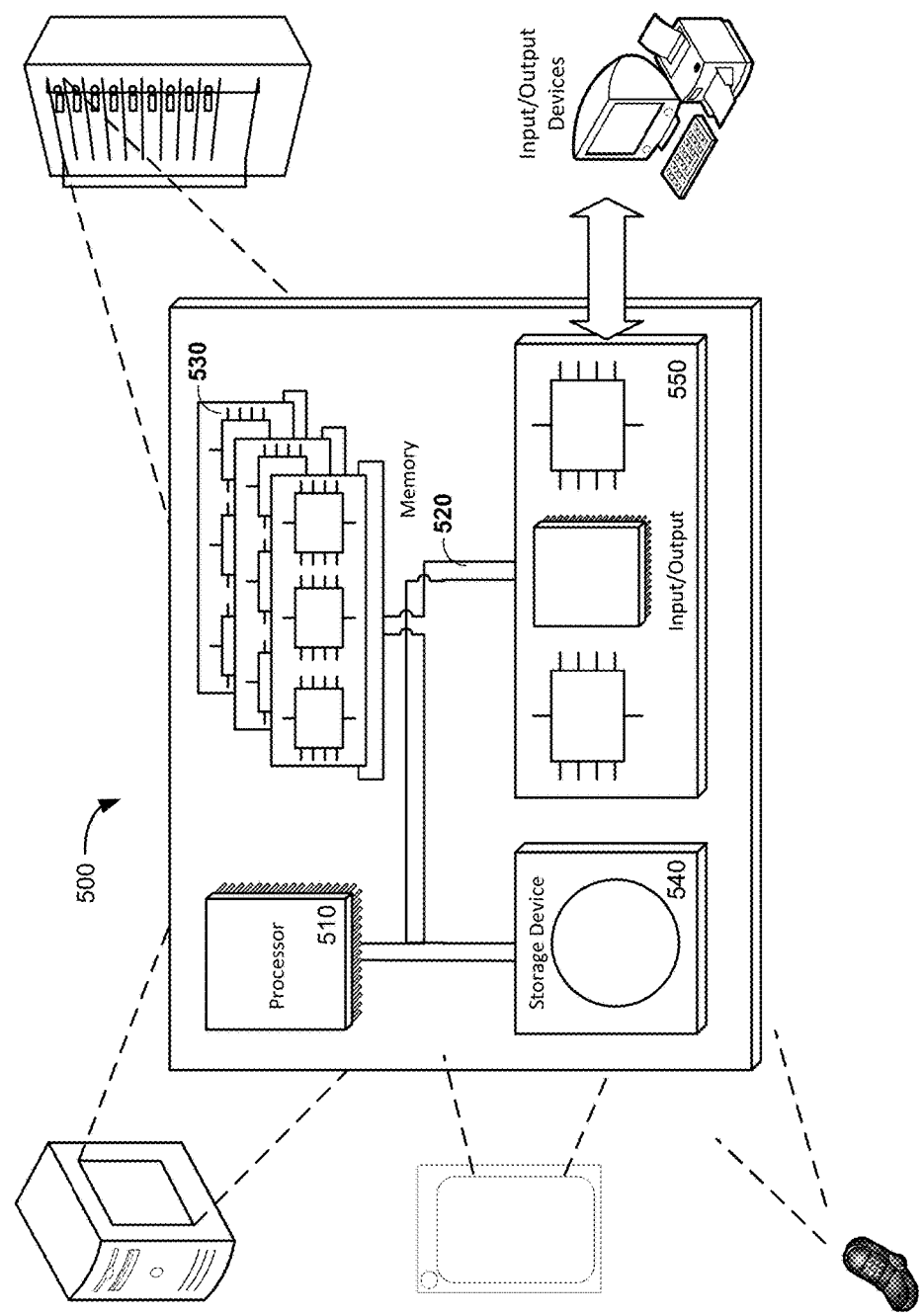
FIG. 6 is a block diagram illustrating example devices providing computing environments for implementing the techniques described herein.

FIG. 6 shows a detailed example of various devices that may be configured to implement some embodiments in accordance with the current disclosure. For example, device 500 may be a workstation, a computing center, a cluster of servers or other example embodiments of a computing environment, centrally located or distributed, capable of executing the techniques described herein. Any or all of the devices may, for example, implement portions of the techniques described herein for detecting fraudulent usage of telephone networks.

In this example, a computing device 500 includes a hardware-based processor 510 that may execute program instructions or software, causing the computer to perform various methods or tasks, such as performing the techniques described herein. Processor 510 may be a general-purpose processor, a digital signal processor (DSP), a core processor within an Application-Specific Integrated Circuit (ASIC) and or other processing circuitry for executing machine instructions. Processor 510 is coupled via bus 520 to a memory 530, which is used to store information such as program instructions and other data while the computer is in operation. A storage device 540, such as a hard disk drive, nonvolatile memory, or other non-transient or non-transitory storage device stores information such as program instructions, data files such as training data 26, sample call data 24, data characterizing trained models for algorithms described herein, and other information. As another example, computing device 500 may provide an operating environment for execution of one or more virtual machines that, in turn, provide an execution environment for software for implementing the techniques described herein.

The computing device 500 may also communicate via various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems. Storage device 540 may store training data 26 accessible to processor 510. Storage device 540 may store sample call data 24 accessible to processor 510. Storage device 540 may store instructions coded to implement any of the techniques of this disclosure to execute an algorithm (e.g., a Pyrite algorithm) for identifying anomalous telephone call patterns.

Figure 7:
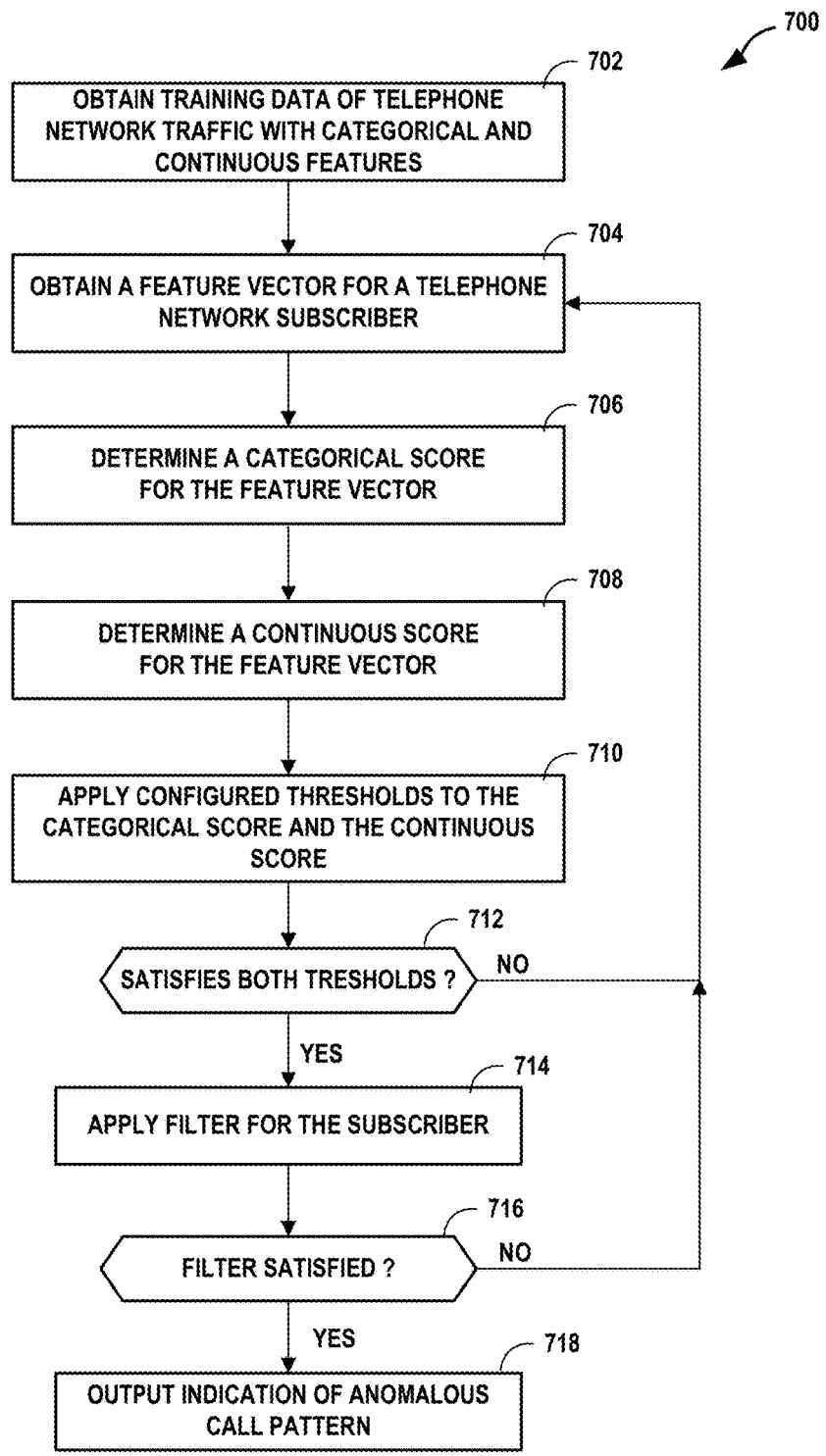
FIG. 7 is a block diagram illustrating an example mode of operation for a computing device for identifying anomalous telephone call patterns, according to techniques described in this disclosure.

FIG. 7 is a block diagram illustrating an example mode of operation for a computing device for identifying anomalous telephone call patterns, according to techniques described in this disclosure. Mode of operation 700 is described with respect to a computing device 500 operating as anomaly detection system 30 of FIG. 1.

Input element(s) 550 of computing device 500 obtain training data 26 that includes a telephone network traffic dataset (702). Processor 510 may store training data 26 to storage device 540. Training data 26 may include one or more samples or data points that each represents a feature vector including a mixed set of categorical and continuous features for one or more subscribers and one or more call records. Input element(s) 550 of computing device 500 obtain a feature vector for a telephone network subscriber (704). The feature vector may be one of one or more feature vectors in sample call data 24. Processor 510 may store the feature vector to storage device 540. The feature vector may include a mixed set of categorical and continuous features that characterize a recent call history for the telephone network subscriber.

Processor 510 applies a first algorithm to the categorical values of the categorical features to determine the categorical score for the feature vector (706). Processor 510 may apply the first algorithm to implement the following equation for according to:

$$\text{score}_{cat}(x_i) = \sum_{d \subseteq x_i^c \wedge d \in D_p} \left( \frac{1}{supp(d)|d|} \right),$$

where $x_i^c$ represents the categorical values of the feature vector, $x_i$ represents the feature vector, categorical itemset d from all possible categorical itemsets D for the one or more categorical features comprises a combination of respective categorical values for at least one of the one or more categorical features, $D_p$ is a set of infrequent itemsets within a training dataset X, $|d|$ is a number of categories values in the categorical itemset d, and supp(d) is a support of itemset d within a training dataset X. $\text{Score}_{cat}(x_i)$ represents the categorical score of the feature vector. In some examples, the categorical scores for feature vectors are in the range [0, 1].

Processor 510 may apply an isolation forest algorithm to the continuous values of the continuous features to determine the continuous score for the feature vector (708). For the feature vector, a categorical itemset d from possible categorical itemsets D for the one or more categorical features of the feature vector are a combination of respective categorical values for at least one of the one or more categorical features. Processor 510 may thus apply the isolation forest algorithm by applying, to the continuous values, respective isolation forest models fit for categorical itemsets $D_g$ from D to determine respective anomaly scores for the categorical itemsets $D_g$, and combining the respective anomaly scores for the categorical itemsets $D_g$ to determine the continuous score for the feature vector. In some examples, the categorical scores for feature vectors are in the range [0, 1].

Input element(s) 550 of computing device 500 receive a categorical threshold value and a continuous threshold value. Processor 510 may store the threshold values to storage device 540. Computing device 500 may provide a configuration interface by which a user may configure/tune the threshold values. Processor 510 applies the categorical threshold value to the categorical score for the feature vector and also applies the continuous threshold value to the continuous score for the feature vector (710). If both threshold values are satisfied (e.g., the scores meet or exceed the respective threshold values) (YES branch of 712), processor 510 may, in some examples, apply a subscriber history filter to the feature vector, or to the raw telephone call data on which the feature vector is based, to reduce false positives generated on legitimate subscribers who happen to have usage patterns that are different from the norm (714).

Satisfying the categorical and continuous threshold values identifies behavior that is abnormal in nature when viewed against the entire network's customer usage or specific segments in the customer base. However, this behavior may be valid for the particular subscriber whose activity resulted in generating the alert. To reduce the occurrence of this issue, anomaly detection system 30 may provide a filter that discards fraud alerts for subscribers whose current behavior does not differ significantly from past behavior, based on the subscribers' most recent year of usage history.

To apply the filter when an alert is generated (e.g., YES branch of 712), processor 510 queries a call history database to obtain network usage data for the past year for the subscriber associated with the feature vector. The network usage data may be grouped by day, and for each day processor 510 calculates a variety of features to produce multiple time series of feature values that characterize that subscriber's usage history. Each feature belongs to a feature group. Processor 510 computes statistics (average and standard deviation) for each feature time series. If current feature values (based on their most recent day of usage) are multiple standard deviations above the average, then the alert is considered valid (YES branch of 716); otherwise the alert is discarded (NO branch of 716).

Example feature groups and features are as follows:
Voice Usage Group
    Daily Voice Duration: sum of seconds of talk time
    Daily Voice Count: count of calls made/received
Data Usage Group
    Daily Data Usage: sum of bytes of data used
New Phones Dialed Group
    Number of New Phones Dialed: number of previously unseen phone numbers dialed in current day
    Count of Calls to New Phones: number of calls to previously unseen phone numbers made/received in current day
    Duration of Calls to New Phones: sum of seconds of talk time with previously unseen phone numbers in current day
New Countries Dialed Group
    Number of New Countries: number of previously unseen countries (dialed & received calls) in current day
    Count of Calls to New Countries: number of calls to previously unseen countries made/received in current day
    Total Duration of Calls to New Countries: sum of seconds of talk time with phones in previously unseen countries in current day Processor 510 computes an average and standard deviation of a subscriber's daily feature values over the subscriber's past year of usage as well as the feature values for the current day (where the feature vector is based on a one day telephone call history—other time periods are possible, e.g., one or more hours, multiple days, etc.). Processor 510 compares the yearly averages with the feature values to determine if the feature values are significantly greater, e.g., based on the standard deviation. If so, the filter is satisfied (YES branch of 716) and processor 510 may direct output elements 550 to output an indication of an anomalous call pattern for the feature vector (718). In some cases, this indication is referred to as a "history alert," meaning that the alert determined at step 712 should be treated as valid (i.e., the alert is not a false positive).

Further example details for operations for generating a history alert are as follows:
1) Compute the per-day historical features average, historical_feat_avg, and the historical features standard deviation, historical_feat_stddev.
2) For each feature, calculate the z-score for the current day feature value.
    a) z-score=(current_day_feat_value−historical_feat_avg)/historical_feat_stddev
3) For each feature group, the max z-score is recorded.
4) Each max z-score is rounded down to the nearest integer, 1 is subtracted, and values less than zero are set to zero. This may ensure that a collection of small values cannot add up to exceed the threshold in the next two steps.
5) There is now one number per group (these are adjusted max z-scores). Add up these adjusted max z-scores. (Adjusted max z-scores across all groups are summed.)
6) If the sum is greater than a user-configurable threshold (e.g., 1), then the alert is a likely a true positive; generate and output a history alert (718).

An indication of an anomalous call pattern for the feature vector may be a flag or other value stored in association with the feature vector and/or subscriber identifying information, for instance with classification data 34. The indication may be a user interface element for output at a user interface device 42 and indicating to a user of the user interface device 42 that the subscriber associated with the feature vector is experiencing an anomalous call pattern, or other indication.

5. CONCLUSIONS

Fraud detection in streaming cellular network usage data is an increasingly complex and important problem. The algorithm with implementations described herein (i.e., "Pyrite") is designed to natively handle mixed feature datasets and may obtain both high computational efficiency and predictive performance in order to meet the demands of this domain. The algorithm was benchmarked on a synthetic dataset simulating multiple attack types and verified that it met objectives and outperformed two other state of the art methods.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices, or in combinations of these. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), nonvolatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A computing device comprising:
one or more programmable processors operably coupled to a memory, the memory configured to cause the one or more programmable processors to:
receive a feature vector that characterizes a call history for a telephone network subscriber, wherein the feature vector comprises respective categorical values for one or more categorical features and respective continuous values for one or more continuous features;
apply, to the categorical values, a first algorithm to determine a categorical score for the feature vector;
apply, to the continuous values, an isolation forest algorithm to determine a continuous score for the feature vector; and
output, in response to determining at least one of the categorical score for the feature vector and the continuous score for the feature vector indicates the feature vector is anomalous, an indication that the feature vector is anomalous.

2. The computing device of claim 1,
wherein a categorical itemset d from possible categorical itemsets D for the one or more categorical features comprises a combination of respective categorical values for at least one of the one or more categorical features,
wherein to apply the isolation forest algorithm, the memory is configured to cause the one or more programmable processors to:
apply, to the continuous values, respective isolation forest models fit for categorical itemsets $D_g$ from D to determine respective anomaly scores for the categorical itemsets $D_g$; and
combine the respective anomaly scores for the categorical itemsets $D_g$ to determine the continuous score for the feature vector.

3. The computing device of claim 2, wherein to apply the isolation forest algorithm, the memory is configured to cause the one or more programmable processors to:
determine, from possible categorical itemsets D, the categorical itemsets $D_g$ that include each categorical itemset d having all of one or more mandatory categorical features.

4. The computing device of claim 3, wherein the one or more mandatory categorical features are user-specified.

5. The computing device of claim 3, wherein to apply the isolation forest algorithm, the memory is configured to cause the one or more programmable processors to:
determine, from a plurality of possible categorical itemsets D, the categorical itemsets $D_g$ as only including each categorical itemset d that:
(1) includes all of the one or more mandatory categorical features; and
(2) has a number of categorical values that satisfies a maximum length parameter.

6. The computing device of claim 2, wherein the memory is configured to cause the one or more programmable processors to:
determine, from a training set, one or more training feature vectors that each has a categorical itemset that has a number of matching training feature vectors from the training set to satisfy a low support parameter; and
fit each isolation forest model of the isolation forest models to respective continuous values for one or more continuous features of the determined one or more training feature vectors that each includes all of the one or more categorical values of the corresponding categorical itemset from the categorical itemsets $D_g$ for the isolation forest model.

7. The computing device of claim 2, wherein the memory is configured to cause the one or more programmable processors to:
fit each isolation forest model of the isolation forest models to respective continuous values for one or more continuous features of one or more training feature vectors that each includes all of the one or more categorical values of the corresponding categorical itemset from the categorical itemsets $D_g$ for the isolation forest model.

8. The computing device of claim 2, wherein the memory is configured to cause the one or more programmable processors to:
fit each isolation forest model of the isolation forest models to one or more training feature vectors according to:
$X_d = \{x_i \in X | x_i^c \supseteq d\}$, where $X_d$ is the set of training feature vectors containing a categorical itemset d; and
$iforest_d = train\_model(X_d^q)$, where $X_d^q$ are the continuation values for one or more continuous features of $X_d$.

9. The computing device of claim 2, wherein the memory is configured to cause the one or more programmable processors to apply the isolation forest algorithm according to:

$$score_{cont}(x_i) = \frac{1}{|d \in D_g \wedge x_i^c \supseteq d|} \sum_{d \in D_g \wedge x_i^c \supseteq d} [iforest_d(x_i^q)],$$

where $x_i^c$ represents the categorical values of the instance to be scored,
where $x_i$ represents the feature vector, and
where $x_i^q$ represents the continuous values of the feature vector.

10. The computing device of claim 2, wherein the memory is configured to cause the one or more programmable processors to:
determine $D_g$ according to $D_g = \{d : d \in D | s_d \supseteq MAN\_FEATS \wedge |d| \leq MAX\_LEN\}$, where $s_d$ is the subspace to which categorical itemset d belongs,
where MAN_FEATS specifies one or more mandatory categorical features,
where |d| is a number of categories values in the categorical itemset d, and
where MAX_LEN specifies a number of category values.

11. The computing device of claim 2, wherein the memory is configured to cause the one or more programmable processors to:
fit each isolation forest model of the isolation forest models to respective continuous values for one or more continuous features of one or more training feature vectors that each includes all of the one or more categorical values of the corresponding categorical itemset from the categorical itemsets $D_g$ for the isolation forest model;

determine, for each isolation forest model of the isolation forest models, a corresponding mean vector for the respective continuous values for the one or more continuous features of the one or more training feature vectors that each includes all of the one or more categorical values of the corresponding categorical itemset from the categorical itemsets $D_g$ for the isolation forest model;

determine a baseline anomaly score by applying the isolation forest algorithm to the mean vector;

for each continuous value of the continuous values of the feature vector, substituting the continuous value to a corresponding position in the mean vector to obtain a modified mean vector and determining a per-feature score for the continuous value by applying the isolation forest algorithm to the modified mean vector; and output each per-feature score for each continuous value.

12. The computing device of claim 1, wherein the memory is configured to cause the one or more programmable processors to apply, to the categorical values, the first algorithm to determine the categorical score for the feature vector according to:

$$score_{cat}(x_i) = \sum_{d \subseteq x_i^c \wedge d \in D_p} \left( \frac{1}{supp(d)|d|} \right),$$

where $x_i^c$ represents the categorical values of the feature vector, where $x_i$ represents the feature vector, wherein a categorical itemset d from all possible categorical itemsets D for the one or more categorical features comprises a combination of respective categorical values for at least one of the one or more categorical features, where $D_p$ is a set of infrequent itemsets within a training dataset X, where |d| is a number of categories values in the categorical itemset d, where supp(d) is a support of itemset d within a training dataset X.

13. The computing device of claim 12, wherein each categorical itemset $d_i$ from $D_p$ satisifies:

(1) supp($d_i$)<SIGMA, where SIGMA is a user-specified threshold;

(2) |$d_i$|<MAX_LEN, wherein MAX_LEN is a user-specified threshold; and (3) $d_j \neq d_i | d_j \in D_p$, $d_j \neq d_i$.

14. The computing device of claim 1, wherein the continuous features comprise at least one of a call duration group, a call density group, a call direction, a call location group, and a customer details group.

15. The computing device of claim 1, wherein the categorical features comprise at least one of a provider affiliation, a customer type, a customer segment, and a customer status.

16. The computing device of claim 1, wherein a categorical itemset d from all possible categorical itemsets D for the one or more categorical features comprises a combination of respective categorical values for at least one of the one or more categorical features, wherein to apply the first algorithm, the memory is configured to cause the one or more programmable processors to:

determine infrequent categorical itemsets $D_p$ within a training dataset X;

for each infrequent categorical itemset from the infrequent categorical itemsets $D_p$, determine a corresponding number of training feature vectors in the training dataset X having the infrequent categorical itemset;

determine, for each infrequent categorical itemset $d_i$ from infrequent categorical itemsets $D_p$ having categorical values that are a subset of the categorical values of the feature vector, respective anomaly scores based at least on the corresponding number of training feature vectors and a corresponding length for the infrequent categorical itemset $d_i$.

17. The computing device of claim 16, wherein the memory is configured to cause the one or more programmable processors to:

for a categorical feature of the categorical features, accumulate anomaly scores determined for each infrequent categorical itemset $d_i$ that includes the categorical feature to obtain a feature importance of the categorical feature to the feature vector; and output an indication of the feature importance.

18. The computing device of claim 1, wherein the first algorithm comprises an outlier detection algorithm for mixed-attribute data (ODMAD).

19. The computing device of claim 1, wherein the computing device comprises one of a cloud-based computing system, one or more servers, one or more workstations, a computing system executing virtual machines or containers, a mobile computing device, or a mobile phone.

20. The computing device of claim 1, wherein the memory is configured to cause the one or more programmable processors to:

apply, in response to determining at least one of the categorical score for the feature vector or the continuous score for the feature vector indicate the feature vector is anomalous, a filter based on z-scores for features of network usage data for the telephone network subscriber; and output the indication that the feature vector is anomalous in response to determining the filter indicates the feature vector is a true positive.

21. A method comprising:

receiving a feature vector that characterizes a call history for a telephone network subscriber, wherein the feature vector comprises respective categorical values for one or more categorical features and respective continuous values for one or more continuous features;

applying, to the categorical values, a first algorithm to determine a categorical score for the feature vector;

applying, to the continuous values, an isolation forest algorithm to determine a continuous score for the feature vector; and outputting, in response to determining at least one of the categorical score for the feature vector and the continuous score for the feature vector indicates the feature vector is anomalous, an indication that the feature vector is anomalous.

22. The method of claim 21, wherein a categorical itemset d from possible categorical itemsets D for the one or more categorical features comprises a combination of respective categorical values for at least one of the one or more categorical features, wherein applying the isolation forest algorithm comprises:
  applying, to the continuous values, respective isolation forest models fit for categorical itemsets $D_g$ from D to determine respective anomaly scores for the categorical itemsets $D_g$; and
  combining the respective anomaly scores for the categorical itemsets $D_g$ to determine the continuous score for the feature vector.

23. The method of claim 22, wherein applying the isolation forest algorithm comprises determining, from possible categorical itemsets D, the categorical itemsets $D_g$ that include each categorical itemset d having all of one or more mandatory categorical features.

24. The method of claim 23, wherein the one or more mandatory categorical features are user-specified.

25. A non-transitory computer-readable medium comprising instructions for causing at least one programmable processor to:

receive a feature vector that characterizes a call history for a telephone network subscriber, wherein the feature vector comprises respective categorical values for one or more categorical features and respective continuous values for one or more continuous features;

apply, to the categorical values, a first algorithm to determine a categorical score for the feature vector;

apply, to the continuous values, an isolation forest algorithm to determine a continuous score for the feature vector; and output, in response to determining at least one of the categorical score for the feature vector and the continuous score for the feature vector indicates the feature vector is anomalous, an indication that the feature vector is anomalous.

* * * * *